May 29, 1956 O. H. BANKER 2,747,697
VACUUM POWERED HYDRAULIC BRAKES WITH ANTI-SKID CONTROLS
Filed Aug. 9, 1952 4 Sheets-Sheet 1

INVENTOR.
Oscar H. Banker,
BY
Cromwell, Greist-Warden
Attys.

May 29, 1956 O. H. BANKER 2,747,697
VACUUM POWERED HYDRAULIC BRAKES WITH ANTI-SKID CONTROLS
Filed Aug. 9, 1952 4 Sheets-Sheet 2

INVENTOR.
Oscar H. Banker,
BY
Cromwell, Greist & Warden
ATTYS.

May 29, 1956     O. H. BANKER     2,747,697
VACUUM POWERED HYDRAULIC BRAKES WITH ANTI-SKID CONTROLS
Filed Aug. 9, 1952     4 Sheets-Sheet 3

INVENTOR.
Oscar H. Banker,
BY
Cromwell, Greist & Warden
Attys

May 29, 1956      O. H. BANKER      2,747,697
VACUUM POWERED HYDRAULIC BRAKES WITH ANTI-SKID CONTROLS
Filed Aug. 9, 1952      4 Sheets-Sheet 4

INVENTOR.
Oscar H. Banker,
BY
Cromwell, Greist & Warden
attys.

2,747,697

VACUUM POWERED HYDRAULIC BRAKES WITH ANTI-SKID CONTROLS

Oscar H. Banker, Evanston, Ill., assignor to New Products Corporation, Chicago, Ill., a corporation of Delaware Application August 9, 1952, Serial No. 303,519

16 Claims. (Cl. 188—152)

This invention relates, generally, to improvements and innovations in manually-controlled, power-operated units for incorporation in hydraulic brake systems, and it has particular relation to the combination of skid control features and devices with such units whereby when an equipped vehicle goes into a skid condition the brakes are automatically released and then automatically re-applied as soon as the skid condition is corrected.

This application is a continuation-in-part of my co-pending application Serial No. 208,951 filed on February 1, 1951. In said copending application I disclose manually-controlled, power-operated units for the hydraulic brake systems of motor vehicles wherein such a unit is adapted to be inserted in series relationship in the conduit connecting the master cylinder with the wheel brakes and operates in such a manner that the master cylinder is in direct fluid pressure-communicating relationship with the wheel brakes when they are released and this relationship continues to exist until such time as the slack is taken up and the friction engaging surfaces of the brakes are brought into inter-engagement. At such time, the power-operated braking pressure delivery unit begins to function and after first isolating or severing the master cylinder from its direct fluid pressure-communicating relationship with the brakes, it creates and delivers sufficient braking pressures to the brakes to actuate the same and maintains such pressures as long as the brake pedal is held down with force sufficient to take up the slack and apply the friction surfaces of the brakes.

In accordance with the present invention certain improvements and innovations have been made in the manually-controlled, power-operated units disclosed in my said copending application. An automatically operating skid control is incorporated in a braking system with the manually-controlled, power-operated unit disclosed in my said copending application. Such skid control is uniquely combinable with the manually-controlled, power-operated unit disclosed in my copending application because of the fact that when such a unit is in operation the direct fluid pressure-communicating relationship between the master cylinder and the brakes is only temporarily disrupted whereupon the master cylinder is brought into indirect pressure-responsive relationship with the brakes by means of the pressure delivery unit. Because of this unique operating relationship, as will appear more fully hereinafter, it is possible to employ the skid control temporarily to release the brakes without any danger or even possibility of loosing the braking action completely.

It is known that the primary cause for a vehicle to go into a skid condition and continue therein is the locking of one or more of the wheels so that they fail to rotate. Conversely, it has been established that the fastest and safest way to bring a vehicle out of a skid is to temporarily release the brakes so as to permit the locked wheel or wheels to again rotate before re-applying the brakes. Furthermore, it is known that maximum braking action is obtained when a braking pressure is applied which permits the wheels to continue to rotate and yet does not result in the locking of the wheels against rotation. This follows from the fact that less efficient braking action is obtained when a wheel is locked against rotation and begins to slide than when it is still rotating but the maximum braking pressure short of freezing is applied.

When a vehicle goes into a skid, the ordinary operator instinctively and automatically applies the brakes all the harder. Only the most experienced and calmest operators can bring themselves to temporarily release the brakes under skid conditions even though it is commonly understood that this is the correct thing to do. The automatic braking system and skid control which is disclosed herein permits an operator to follow his instinct and normal reaction when his vehicle goes into a skid and apply the brakes as hard as he wishes. The skid control automatically operates to repeatedly release and re-apply the brakes as many times as necessary to bring the car out of the skid and yet apply the brakes with maximum effectiveness. Furthermore, the skid control can be so designed that it will eliminate undue forward jolting when the brakes are applied suddenly and thereby prevent the occupants from becoming injured by reason of being thrown against the windshield, dash or some other hard part of the vehicle interior.

In addition to the skid control, another improvement and innovation provided by the present invention in the brake system disclosed in my said copending application is an accumulator or modulator device which makes the braking action much more sensitive and easier for the operator to regulate, especially when a gentle braking action is called for.

There are certain other improvements and innovations that are disclosed herein and which appear hereinafter.

One object of this invention is a manually controllable, power-operated hydraulic brake system for vehicles which includes a manually-controlled, power-operated braking pressure delivery unit having in combination therewith a skid control which operates automatically to cyclically release and re-apply the brakes as many times as necessary to overcome the skid condition without any possibility of the brakes being completely lost from control by the operator.

An object of the invention is a power-operated braking pressure delivery unit and skid control combination for incorporation in a conventional hydraulic brake system so as to render the brake system manually-controllable through the brake pedal in so far as power operation thereof is concerned and subject to automatic skid control so that if and when an equipped vehicle goes into a skid condition the brakes are automatically released and re-applied as often and as long as necessary without the operator at any time loosing or releasing the brakes.

Another object of the invention is a combination of a manually-controlled, power-operated braking pressure delivery unit and an automatically operable skid control which combination is adapted to be inserted or incorporated in a known or conventional hydraulic brake system.

Another object of the invention is an improved manually-controlled, power-operated unit for hydraulic brakes which is adapted to be inserted into the brake fluid conduit interconnecting the master cylinder and the brakes and which operates to sever the normal direct fluid connection from the master cylinder to the brakes when the pressure is raised to a predetermined value by operating the master cylinder and to thereafter deliver pressures to operate the brakes which are desired multiples of the pressure created in the master cylinder. A specific object and innovation in such a manually-controlled, power-operated unit is the provision of a pressure cylinder wherein the severing action is obtained and the braking pressures are created by a plunger which is inserted through a stationary seal located at the entrance to the pressure cylinder, such plunger having a loose fit with respect to the interior of the pressure cylinder. A further specific object is the use of such a power unit in a hydraulic brake system in such a manner that the pedal ratio and pedal travel are reduced and a lower pedal is provided, and yet because of the operation of the power unit to take up the slack and operate the brakes the pedal pressure is greatly reduced. Preferably, a by-pass valve is incorporated in the unit so that direct braking action from the master cylinder will always be available in case of failure of the power unit. While the pedal ratio may be substantially reduced, it will still permit adequate and safe braking in the event of failure of the power unit and direct braking action is required.

Another object of the invention is a manually-controllable, power-operated unit for incorporation in a fluid or hydraulic brake system which operates to mechanically sever the direct fluid communication relationship between the master cylinder and the brakes following which severing action increases in pressure from the master cylinder are multiplied in the power-operated unit and wherein the master cylinder is continually connected in direct fluid communication relationship with an accumulator device so that after the direct fluid connection between the master cylinder and the brake is mechanically severed off, additional downward movement of the brake pedal or other operating lever will result in a diversion of fluid into the accumulator thereby providing a sensitive and "soft pedal" braking action response to the operator.

A specific object of the invention is such a manually-controllable, power-operated unit which is simple in construction and design, is free of parts which are subject to excessive wear, is easy to service, and has an air cylinder as a power-furnishing element which can be very conveniently removed from its place on the unit.

Still another important object of the invention is a valve control unit for a manually-controlled, power-operated unit for hydraulic brake systems, such valve control unit having a shiftable valve plunger which in operation is subject to differential between master cylinder pressures and braking pressures, this valve plunger having only a very small movement which through a lever arm is magnified to a relatively large movement which is employed to operate valve members for controlling the alternate admission of air pressure and vacuum for actuating the power unit.

Certain other and additional objects of the invention will, in part, be obvious and will, in part, appear hereinafter.

For a more complete understanding of the nature and scope of the invention, reference may now be had to the following detailed description of certain embodiments thereof taken in connection with the accompanying drawings, wherein.

Figures 1, 10:
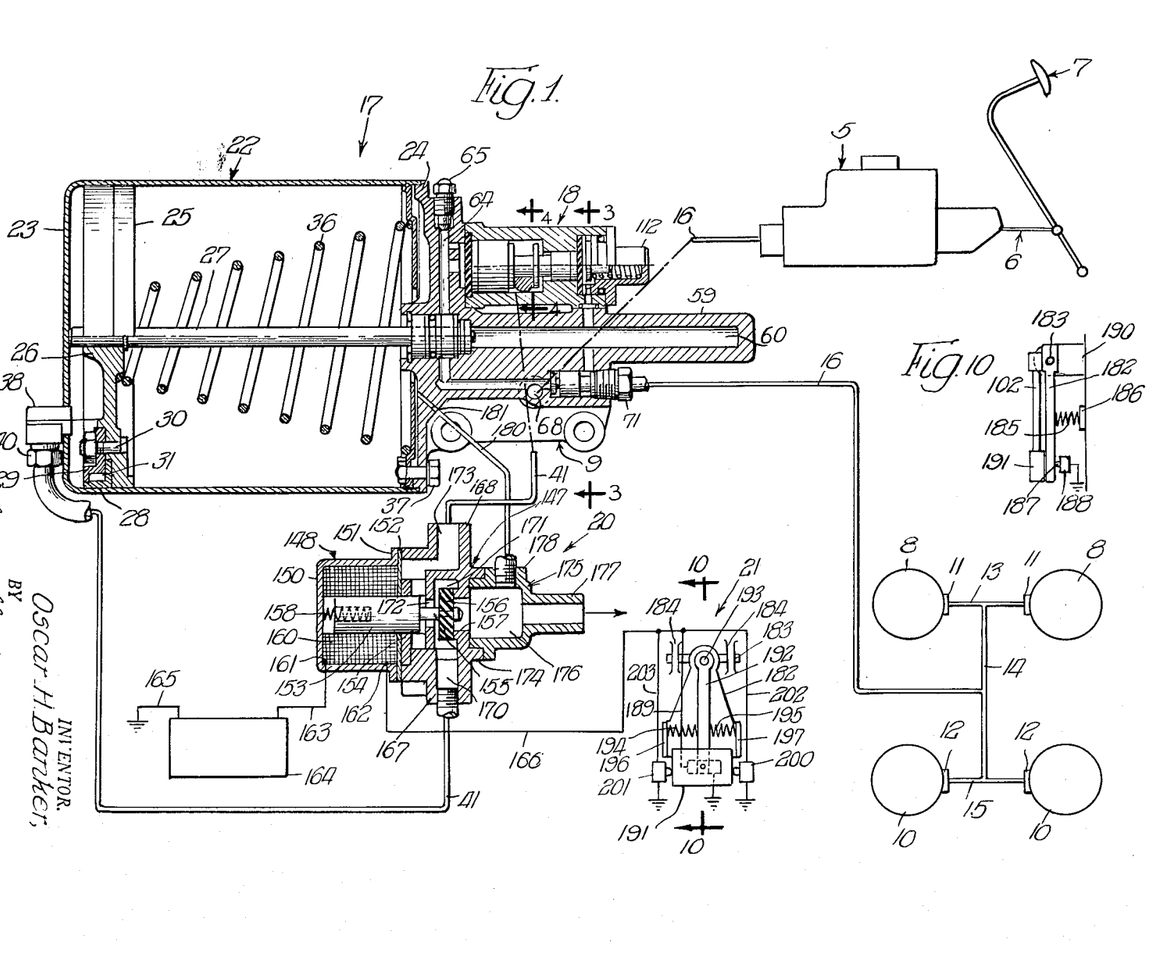
Fig. 1 is a partially diagrammatic and partly sectional view of a hydraulic brake system for a motor vehicle incorporating one embodiment of the present invention.
Fig. 10 is a sectional view of the skid control unit taken on line 10—10 of Fig. 1.

In Fig. 1 of the drawings the master cylinder of the hydraulic brake system of a modern automobile is represented diagrammatically at 5 and is operatively connected by means of a linkage indicated diagrammatcially at 6 with a brake pedal designated generally at 7. The front brakes of the vehicle are designated at 8—8, and the rear brakes are designated at 10—10. Such brakes are equipped with conventional fluid operated pulsators which are indicated at 11—11 and 12—12, respectively. The front brakes 8 are served with hydraulic fluid from a branch conduit 13 connected to one end of a distributor conduit 14 and the rear brakes 10 are served with brake fluid by a branch conduit 15 connected to the opposite end of the distributing conduit 14. The distributing conduit section 14 is connected with the master cylinder 5 by means of a conduit 16.

The equipment thus far described comprises a conventional or typical hydraulic brake system for an automobile, truck or other motor vehicle. Such a conventional hydraulic brake system is manually controlled by means of the brake pedal 7 and powered by the operator through his application of force to the foot pedal 7 or any other operating lever that may be utilized.

Figure 2:
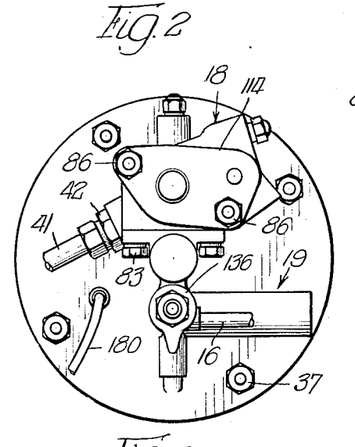
Fig. 2 is a right end elevational view of a power unit forming a part of the system shown in Fig. 1 and which is manually-controlled by the brake pedal to produce and deliver the braking pressure for the system.

The improvements of the present invention may be incorporated into such a conventional hydraulic brake system by opening up the conduit 16 normally providing direct fluid communication between the master cylinder 5 and the brakes 8, 10 and inserting therein a power unit which is indicated, generally, at 17. The power-operating unit 17 includes as sub-units thereof a control valve unit indicated generally at 18 (Fig. 1) and a modulator unit indicated generally at 19 (Fig. 2). In addition the power unit 17 has operatively associated therewith a skid control mechanism which comprises a solenoid-operated valve unit indicated generally at 20 (Fig. 1) and a skid and jolt sensitive control unit indicated generally at 21.

Figure 6:
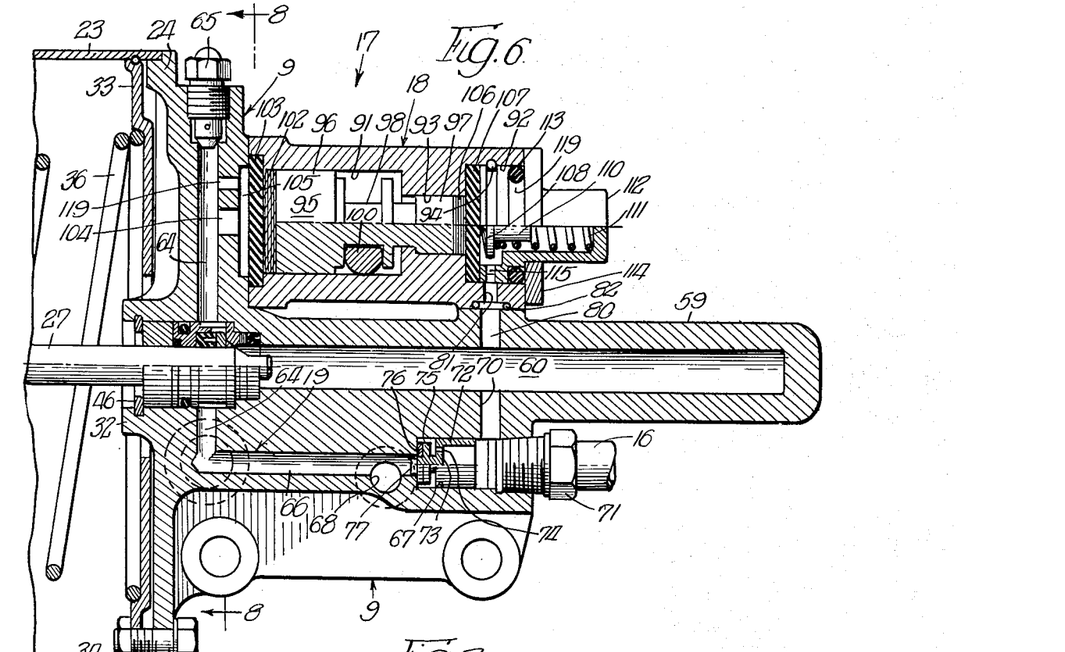
Fig. 6 is a fragmentary vertical sectional view on enlarged scale of a portion of the power unit shown in Fig. 1.

The power unit 17 is powered or energized by means of a vacuum cylinder unit indicated generally at 22, although it will be understood that other forms and types of energizers may be utilized. The vacuum cylinder unit may be one of known commercial type and comprises a cup or casing 23 closed at one end by means of an integrally formed end wall closed at its mouth or opposite end by means of a plate or disk 24 integrally formed as part of a casting indicated generally at 9. The rim of the casing 23 fits in a shoulder formed around the disk 24 as shown in Figs. 1 and 6. A piston 25 mounted on one end of a piston rod 27 is adapted to reciprocate within the casing 23 and to occupy various intermediate positions therein depending upon the relative pressures applied to the opposite faces thereof. The piston 25 has an integrally formed hub 26 whereby it is mounted on the end of the piston rod 27. The piston 25 includes a leather washer 28 which is clamped in place by means of a ring member 29 attached to the piston 25 by means of bolts 30—30. The ring member 29 is so shaped as to provide space for an annular wick 31 which serves to carry oil to the upper portion of the washer 28 to keep it soft. The wick 31 soaks oil from a shallow pool (not shown) maintained in the bottom of the casing 23.

The end of the piston rod 27 opposite the piston 25 passes through a hub 32 integrally formed as part of the disk 24. A disk member 33 fits over the hub 32 and the periphery thereof is provided with a flange 34 which fits against a split ring 35 seated in a groove formed in the casing 23 as shown in Fig. 6.

The disk 33 serves as a support for the large end of a conical coil compression spring 36. A plurality of bolts 37—37 passing through the disk 24 and the disk 33 serve to draw the latter toward the disk 24 and to retain the casing 23 in place thereon. The small end of the spring 36 presses against the rear of the piston 25 and urges it into the retracted position shown in Fig. 1. This particular construction is advantageous because it allows the air cylinder 22 to be easily and quickly detached or attached simply by unscrewing or replacing the bolts 37—37. The spring 36 will be retained in the casing 23 by the plate 33.

The end wall of the casing 23 is provided with a fitting 38 having a coupling nut 40 by means of which one end of conduit 41 may be connected into the adjacent end of the casing 23. The conduit 41 at the end opposite that connected to the adapter 38 is (as shown in Fig. 2) connected by means of a suitable fitting 42 into a port of the control valve unit 18. The solenoid-operated skid control valve 20 is connected in series relationship in the conduit 41 as shown in Fig. 1.

Figure 7:
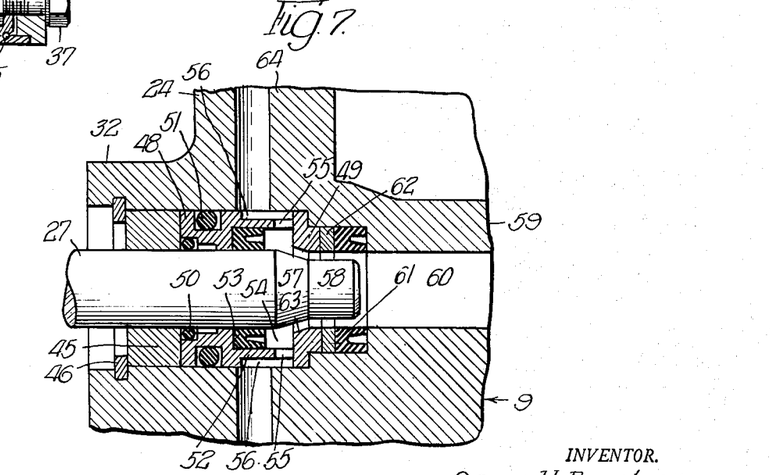
Fig. 7 is a fragmentary detail view on enlarged scale of a portion of the mechanism shown in Fig. 6.

Referring particularly to Fig. 7, the hub 32 of the plate 24 has a bearing 45 seated therein which supports the end of the piston rod 27 projecting from the cylinder 22. The bearing 45 is retained in place by means of a split ring clip 46 which is seated in a slot provided therefor on the interior of the hub 32. An air-tight seal is formed around the projecting end of the piston rod 27 by means of a seal retainer sleeve member 48 one end of which engages the bearing 45 and the opposite end of which engages a collar member 49. The retainer 48 has a groove formed in one end thereof as shown for receiving an O-ring seal 50 and is provided with an exterior groove for receiving a second O-ring seal 51. The opposite end of the retainer sleeve 48 is provided with an integral extension of reduced outside diameter 52 which serves as a retaining band for sealing ring 53 having a U-shaped cross section as shown and formed of a suitable material. The section 52 projects beyond the outer end of the gasket 53 and provides an annular chamber 54 around the piston rod 27. The projection 52 is provided with a band of circumferentially spaced ports 55 which serves to provide communication between the inner chamber 54 and an annular chamber 56 defined between the exterior surface of the extension 52 and the opposing interior surface of the cylindrical chamber in the casting 9 in which the retainer sleeve 48 is disposed.

The projecting end of the piston rod 27 is provided with a conical taper as indicated at 57 which reduces to a cylindrical end projection 58. The end of the piston rod 27 serves as a plunger and the end 58 and tapered portion 57 facilitate its entry in and passage through a sealing arrangement located at the entrance end of a pressure chamber 60 in an elongated cylinder 59 integrally formed as a portion of the casting 9.

The sealing arrangement for providing a fluid-tight seal between the projecting plunger end of the piston rod 27 and the entrance into the chamber 60 in the cylinder 59 comprises a ring seal 61 seated as shown within the inner end of the chamber provided therefor in the casting 9 and communicating between the chamber 60 in hte cylinder 59 and the chamber which contains the sleeve retainer member 48. It will be noted that the interior diameter of the ring seal 61 is smaller than the full exterior diameter of the piston rod 27 whereby the seal 61 must be expanded and compressed when the plunger acting end of the piston rod passes therethrough. The ring seal 61 is retained in place by means of a fiber spacer ring 62 which in turn is held in place by means of the collar 49. The inner surface of the collar 49 is tapered as indicated at 63 so as to cooperate with the tapered surface of section 57 of the piston rod 27 when in its retracted position as shown in Fig. 7 and form an annular port communicating between the chamber 54 and the entrance to the chamber 60.

This sealing arrangement is particularly advantageous because it makes it unnecessary to have the plunger end of the piston rod 27 to fit the cylinder 60 with close tolerance or to carry piston rings or other seals thereon. Actually, the piston rod 27 may fit rather loosely within the cylinder 60 and therefore the problem of wear and leakage between a close fitting piston and its cylinder is eliminated.

The casting 9 has a passageway 64 formed therein which is intersected by the annular chamber 56. The upper end of the passageway 64 is closed by a bleeder screw 65 of known type which facilitates filling of the system with hydraulic brake fluid. The passageway 64 communicates at right angles with another passageway 66 formed in the casting 9 having a counterbored chamber 67 formed at the end thereof.

Figure 3:
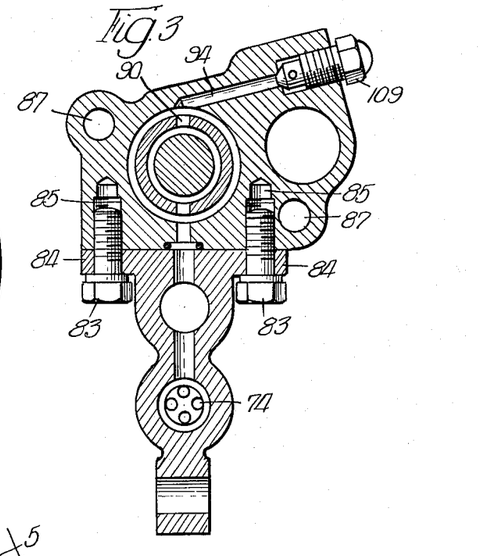
Fig. 3 is a vertical sectional view on enlarged scale taken on line 3—3 of Fig. 1.

Hydraulic fluid from the master cylinder 5 is introduced into the passageway 66 from the conduit 16 through a port 68 in the casting 9. As will be explained in detail hereinafter, the cylinder 59 having the chamber 60 formed therein constitutes a pressure cylinder wherein the power unit 17 operates to compress brake fluid and deliver it under increased pressure to the brakes 8 and 10. The pressure chamber 60 communicates with the chamber 67 through a transverse passageway 70 formed in the casting 9. The chamber 67 is interiorly threaded at the outer end and is provided with an adapter fitting 71 to which is coupled the adjacent end of that section of conduit 16 leading to the brakes 8 and 10. Normally, the brake fluid introduced into the power unit 17 from the master cylinder 5 and entering through the inlet port 68 does not pass directly out through the chamber 67 into the section of the conduit 16 leading to the brakes. The juncture of the passageway 66 with the chamber 67 is normally closed by means of a by-pass valve arrangement comprising a cylindrical valve member 72 which slides within the chamber 67. The valve member 72 has between its ends an integral disk portion 73 in which four ports or openings 74—74 (Figs. 6 and 3) are formed. A flange 75 of reduced diameter is integrally formed on the inner end of the valve member 72 and serves as a support abutment for a gasket 76 fitted over the projecting end 77 of the valve member 72.

As will be explained in detail below, the pressure within the chamber 60 of the cylinder 59, and hence the pressure transmitted through the passageway 70 into the chamber 67 is either equal to or greater than the pressure within the passageway 66. Since the net area of the valve member 72 subject to pressure within the chamber 67 is greater than the end area thereof which is exposed to pressure from the passage 66, it will be seen that the valve member 72 is normally urged to and held in the closed position shown in Fig. 1 wherein it seals off the chamber 67 from the passageway 66. However, should there be a failure on the part of the power unit 17 to operate so that the normal pressure would fall in the chamber 60 coupled with a failure of the plunger 27 to withdraw from the cylinder 60, then the pressure in the passageway 66 delivered from the master cylinder 5 will become sufficient to shift the valve member 72 to the right as viewed in Fig. 6 and thereby open the port leading from the passageway 66 into the chamber 67 so as to communicate the hydraulic pressure from the master cylinder 5 directly through the chamber 67 and thence to the brakes through the section of the line 16 leading to the brakes. Accordingly, this arrangement including the by-pass valve 72 member constitutes a safety feature which insures that manual braking of the vehicle will always be possible and available in case of such failure on the part of the power unit 17.

The chamber 60 in the compression cylinder 59 communicates with the valve control unit 18 through a transverse passage 80. The valve control unit 18 has an inlet port 81 which is aligned with the passage 80 and a fluid-tight seal between the port 81 and passage 80 is provided by means of an O-ring seal 82. The valve control unit 18 is secured in place on the casting 9 by means of a pair of stud bolts 83—83 which extend upwardly through holes provided therefor in lugs 84—84 integrally formed at the top of the cylinder 59 and projecting on opposite sides thereof. The bolts 83 are screwed into tapped holes 85—85 (Fig. 3) which are provided therefor in the under side of the body of the control unit 18. The valve control unit 18 is also further secured onto the casting 9 by means of horizontally extending bolts 86—86 (Fig. 2) which extend through smooth holes 87—87 (Fig. 3) provided therefor in the body of the valve control unit 18 with the ends of the bolts being screwed into threaded holes 88—88 (Fig. 8) provided in the disk 24 of the casting 9.

The valve control unit 18 has a horizontal chamber extending therethrough having large diameter end sections 91 and 92 and a small diameter intermediate section 93. A valve plunger designated generally at 95 is slidably disposed in the chamber in the valve body. The valve plunger 95 has a large diameter end portion 96 which slides in the large diameter section 91 of the chamber and on the opposite end has a smaller diameter end portion 97 which fits slidably within the intermediate and smaller diameter portion 93 of the valve chamber. The valve plunger 95 has a circumferential groove 98 of considerable width and depth formed on the inner end of the large diameter end portion 96 and this circumferential groove 98 cooperates with the valve body to help form a passageway through the valve body as will be explained in connection with Fig. 5 while the sides of the groove 98 serve as prongs of a fork to bear against opposite sides of an enlarged rounded portion 100 of a control lever indicated generally at 101.

The large diameter section 91 of the valve chamber in the valve body is closed off by means of a disk 102 formed of leather or other suitable material which is seated within the valve chamber and which is adapted to bear against a rubber diaphragm 103 which fits within a groove provided therefor in the end of the valve housing and the periphery of which is clamped between the valve body and the opposing face of the casting 9 as shown in Figs. 1 and 6. The passageway 64 in the casting 9 is placed in communication with the outer face of the diaphragm 103 by means of a central transverse port 104 in the casting which opens into a large diameter portion 105 (Figs. 6 and 8) so as to expose a large area of the diaphragm 103 to the hydraulic pressure of the brake fluid in the passage 64. In order to prevent air from becoming trapped in the chamber 105, a small hole 119 is provided at the top of the chamber which leads into the passage 64.

The small diameter end portion 97 of the valve plunger 95 fits against a separator disk 106 so as to prevent the end of the valve plunger itself from bearing against a flexible diaphragm 107. The diaphragm 107 is positioned in the inner end of the valve chamber section 92 where it is subjected to the pressure of a rounded head 108 of a plunger member 110 carried in the end of a coil compression spring 111 which is retained in a hollow plug member 112 fitting in the end of the section 92 as shown. An O-ring seal 113 around the member 112 provides a seal between the exterior of the plug member 112 and the outer end of the chamber section 92. A retainer plate 114 serves to retain the O-ring 113 and the plug 112 in place. The plug member 112 is provided with a transverse passageway or port 115 which is in coaxial registration with the port 81 and provides a path of communication for hydraulic fluid from the chamber 60 to enter the hollow hub member 112 and thereby press against the outer surface of the diaphragm 107. It is to be noted at this point that the area of the end of the small valve plunger end 97 against which the diaphragm 107 acts is considerably smaller than the corresponding area of the end of the enlarged plunger end 96 against which the diaphragm 103 acts. It is because of this difference in area that the pressure created by the master cylinder 5 is multiplied by the power unit 17, this action being explained in detail hereinafter. The multiplication of pressure is proportional to the ratio of these end areas.

In order to provide for the bleeding of the chamber 92 so as to remove any air that may become trapped therein, the plug 112 is provided at the top with a port 90 (Figs. 3 and 6) which leads into a vent passage 94 in the valve body the outer end of which passage is counterbored and threaded and provided with a bleeder valve 109.

Figure 5:
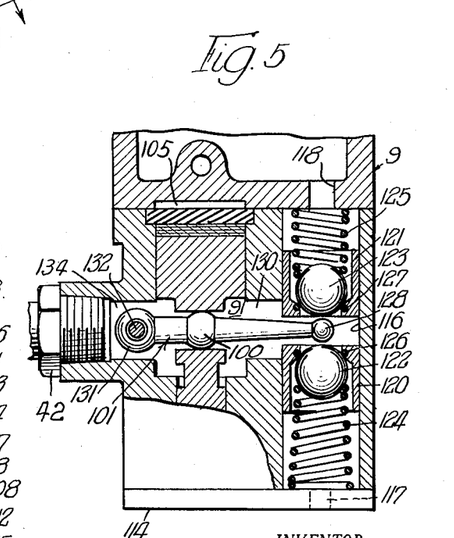
Fig. 5 is a fragmentary sectional view on enlarged scale taken on line 5—5 of Fig. 4.

In addition to the valve chamber for the plunger 95 the body of the valve unit 18 has a second horizontal passageway extending therethrough which is parallel to the first and which is indicated at 116 in Fig. 5. This chamber 116 is of uniform diameter from end to end and the outer end is closed by the plate 114 which is provided with a port 117 by means of which air can enter into the outer end of the chamber 116. Preferably, the port 117 may be connected with the air filter of the vehicle so that atmospheric air will be filtered before it is permitted to enter into the port 117. If desired, the port 117 may be connected to any other source of pressure such as a compressor or a cylinder of compressed gas. The inner end of the chamber 116 registers with a passageway 118 (Figs. 5 and 8) extending through the disk portion 24 of the casting 9 into the interior of the air cylinder 22 as shown in Fig. 5. Accordingly, it will be seen that the outer end of the chamber 116 communicates with the atmosphere (or another suitable source of pressure) through the port 117 while the opposite or inner end of the chamber 116 communicates through the port 118 with the suction or sub-atmospheric pressure maintained within the air cylinder 22 on the rear side of the piston 25.

Ball valve retainers in the form of cup members 120 and 121 are inserted in opposite directions into the chamber 116 so as to retain and provide valve seats for two ball valve members 122 and 123. Each of the valve members is backed up by a coil compression spring 124 and 125, respectively, as shown, whereby each of the ball valve members is normally maintained in its seated position in the end of the respective cup members 120 or 121. In order to provide better seating action and reduce wear, the ball valve members do not seat directly against the metal or material forming the cups 120 and 121 but against O-ring seals 126 and 127 seated in grooves provided therefor as shown in the ends of the cup members 120 and 121.

Figure 4:
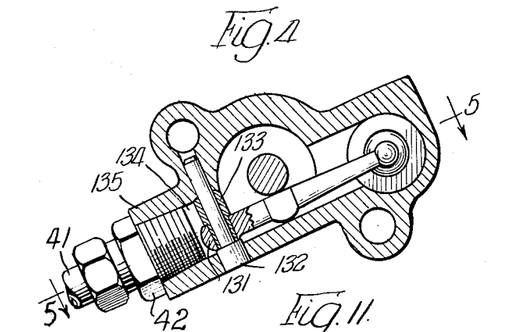
Fig. 4 is an enlarged vertical detail sectional view taken on line 4—4 of Fig. 1 of the control valve unit forming a part of the power unit.

The control lever 101 has a ball member 128 integrally formed on the end thereof so as to fit in between the ball valves 122 and 123 as shown in Fig. 5. Preferably there is ample clearance between the ball end 128 and the ball valve members 122 and 123 so that both may be seated when the lever is in its neutral position. The control lever 101 extends into the chamber 116 through a port 130 which also provides for communication between the chamber 116 and the chamber 91. The control lever 101 has an eye 131 integrally formed on the end thereof opposite the ball end 128 and the shank of a pin 132 extends through the opening in the eye as shown in detail in Fig. 4. The shank of the pin 132 passes through a spacer sleeve or thimble 133, the lower portion of which has a reduced diameter so as to fit within the hole in the eye 131 while the upper end is of larger diameter so as to provide a shoulder for bearing against the upper surface of the eye 131 and for spacing the same from the top of the inlet opening 134 formed in the nipple 135.

As will be explained in greater detail below, the valve plunger 95 is shiftable in opposite directions in the chamber 91 depending on differentials in pressure acting on its opposite ends by virtue of the pressures acting on the diaphragms 103 and 107. Such movement of the valve plunger 95 is imparted to the control lever 101 by the sides of the groove 98 acting on opposite sides of the enlargement 100 in the control lever 101. The control lever pivots about the pin 132 and the ball end 128 is moved in one direction or the other and thus serves to unseat one of the ball valve members 122 or 123. When the ball valve member 122 is unseated, the control valve 18 operates to establish communication through this valve from a source of atmospheric pressure through the line 41 into the air cylinder 22. On the other hand, when the ball valve 123 is opened while the valve 122 remains closed, the valve control unit 18 serves to establish communication between the sub-atmospheric pressure within the air cylinder unit 22 and the opposite side of the piston 25 of this unit.

Referring to Fig. 5 it will be seen that the enlargement 100 is spaced from the fulcrum pin 132 a distance equal to about one-third the length of the lever 101. Of course, the exact spacing may vary but in general there will be a considerable mechanical advantage at the ball end 128 over the enlargement 100. As a result of this mechanical advantage it takes a force acting on the enlargement 100 of three times (or whatever the particular ratio is) the force acting on the ball end 128 in order to balance such force on the ball end 128. Conversely, the movement of the ball end 128 is three times the corresponding movement of the enlargement 100. This construction is of particular value and advantage. Thus, only a very small movement of the diaphragms 103 and 107 is required since such movement is magnified and produces ample movement of the ball valve members 122 and 123 for free passage of air or vacuum. The slight movement of the diaphragms insures that they will not be worked beyond the elastic limit of the material and yet the valve control unit 18 will have a very sensitive operation.

Desired variations in sensitivity and operation of the valve control unit 18 may be obtained by selecting springs 111, 124 and 125 of proper strengths. The strength of the spring 124 which backs up the ball valve member 122 and the strength of the spring 111 acting on the valve member 95 determine the value to which the pressure has to rise in the system in order to bring the power unit into operation. By making these springs sufficiently weak the power unit will begin to operate as soon as there is a noticeable rise in pressure and the unit will then supply the pressure to take up the slack in the brakes and apply the brakes. On the other hand, the springs 111 and 124 may be made of such strength that the power unit will not operate until the slack in the system has first been taken up and the pressure rises considerably. Since the spring 111 has to work against spring 125 acting on ball valve member 123, the spring 111 should be sufficiently stronger than spring 125 so as to compensate for the mechanical advantage ratio and overcome friction. Thus, if spring 125 is a three pound spring and the mechanical advantage ratio is 3:1 the spring 111 should have a strength of nine pounds plus, say, three additional pounds to overcome the friction resistance which the assemblage offers to movement. Accordingly, when the brake pedal 7 is fully released and there is no fluid pressure in the system, the spring 111 will be strong enough to unseat the ball valve 123 and maintain it in the unseated condition.

During the operation of the power braking unit 17 the projecting end of the piston rod 26 constitutes a displacement plunger and enters the chamber 60 in the cylinder 59 and in so doing it amounts to temporarily inserting a plug in the direct fluid pressure-responsive relationship between the master cylinder 5 and the brakes 8 and 10. Thus, it will be seen that once the end of the piston rod 26 enters the cylinder 60, the conduit connection between the master cylinder 5 and the brakes is temporarily severed into two isolated parts or sections. One of these sections includes that portion of the fluid conduit 16 extending between the master cylinder 5 and the inlet port 68 into the unit 17 together with the passageways 66 and 64 formed in the casting 9 plus the additional space provided by the chambers 56 and 54, the port 104, and the chamber 105. It is desirable for reasons which will be explained in greater detail below to provide additional expansion capacity for this section of the fluid conduit system and this is accomplished and provided for by the accumulator device 19.

Figure 8:
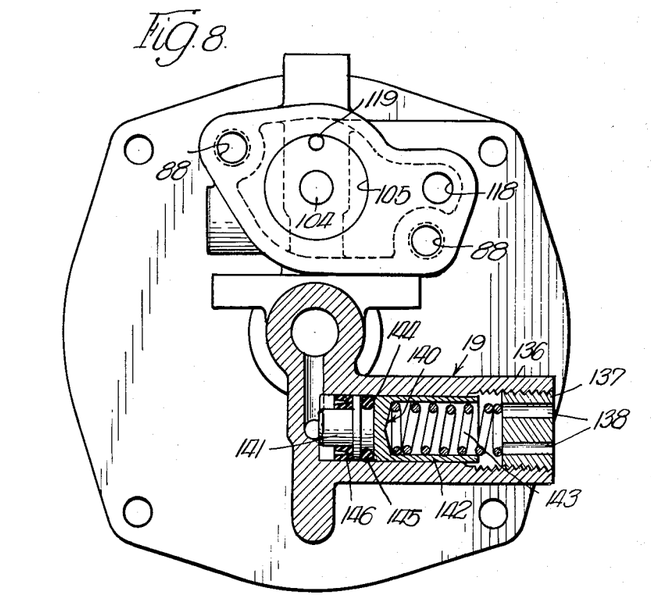
Fig. 8 is a partly end elevational and partly vertical sectional view of the power unit taken on line 8—8 of Fig. 6 with the control valve unit thereof removed.

Reference may now be had to Fig. 8 for a description of the structure of the accumulator device 19. The body of the accumulator 19 is designated at 136 and is in the form of a cylindrical extension formed integrally as part of the casting 9. The outer end of the body 136 is interiorly threaded for reception of an adjustable stop plug 137 which is provided with two ports 138—138 extending therethrough which serve both as ports and also for the insertion of a spanner wrench to be used to adjust the plug 137. The inner end of the bore within the body 136 communicates into the passageway 66. A plunger indicated generally at 140 is disposed within the body 136 and has a reduced diameter projection 141 formed on one end and a cup extension portion 142 formed on the opposite end. A coil compression spring 143 is retained in the cup portion 142 except for a portion of the spring which normally extends beyond the rim of the cup portion. A circumferential groove 144 is formed around the body of the plunger member 140 so as to provide an annular seat for an O-ring 145. A ring seal 146 of U-shaped cross section fits over the extension portion 141 and provides a fluid-tight seal between the plunger 140 and the interior of the accumulator body 136.

It will be seen that hydraulic pressure on the fluid in the system will act against the exposed end of the seal 146 and the end of the plug portion 141 and tend to force the plunger member 140 to the right as viewed in Fig. 8 against the force of the compression spring 143. The plunger member can shift to the right until the end of the cup portion 142 comes into engagement with the inner face of the adjusting plug 137. By utilizing a compression spring 143 of proper calibration and by suitably adjusting the plug 137, it is possible to obtain the desired range of operation of the accumulator or modulator 19. For example, the modulator 19 may be designed and so adjusted that when the pressure in the system equals 50 pounds per square inch the force of the spring 143 will be overcome and the plunger member 140 will commence to shift to the right. Such shifting will continue in proportion as the hydraulic pressure increases above 50 pounds per square inch, until the pressure has reached a total of, say, 300 pounds per square inch at which time the end of the cup extension 142 comes into engagement with the plug 137 so that further movement or shifting of the plunger 140 is prevented. The manner in which the modulator or accumulator device 19 operates in connection with the remainder of the assembly will be further described hereinafter.

The system as thus far described can be utilized as a manually controlled power-operated brake system without the inclusion of additional equipment. However, the skid control feature can be readily incorporated in the system for little additional cost. Such skid control involves the incorporation of the solenoid operated valve 20 and the skid and jolt sensitive control unit 21. The solenoid valve 20 has a valve body 147 to one side of which is fastened a solenoid indicated generally at 148. The casing 150 of the solenoid 148 has an outwardly turned circumferential flange 151 which fits against a closure plate 152 fitting over the adjacent open side of the valve body 147. The armature 153 of the solenoid passes through a central opening provided through the plate 152 and through a seal 154. The projecting end of the armature 153 has a pin extension 155 integrally formed thereon on the end of which is mounted a rubber valve member 156 which is adapted to fit over and close a valve port 157 formed in the valve body 147. A coil compression spring 158 is compressed between the end of the solenoid casing 150 and the bottom of a spring retaining hole provided therefor in the end of the armature 153 and normally holds the valve member 156 in the seated position over the port 157, as shown in Fig. 1. The coil 160 of the solenoid unit 148 has two terminals 161 and 162. Terminal 161 is connected by means of a conductor 163 to one of the terminals of a battery 164 which will normally be the storage battery of the vehicle in connection with which the brake system is utilized. The other terminal of the battery 164 is connected to ground by means of a conductor 165, as indicated. The second terminal 162 of the coil 160 is the ground terminal and it is connected by means of a conductor 166 to the skid and jolt sensitive unit 21.

The valve body 147 has two nipples 167 and 168 by which it may be connected in the conduit 41 communicating between the front end of the air cylinder unit 22 and the control valve unit 18 as described above. The nipple 167 opens by means of a passageway 170 into a valve chamber 171, one wall of which is ported by means of the port 157 and the opposite wall of which is ported by means of a port 172 opening into an outer passageway communicating with a passage 173 in the nipple 168. The valve body 147 has a circumferential flange 174 integrally formed on the side thereof opposite the solenoid 148 into which flange fits the mouth of a fitting 175 having a chamber 176 therein having connections 177 and 178 opening thereinto. The connection 177 will be normally connected to the intake manifold of the vehicle to some other source of sub-atmospheric pressure such as a vacuum cylinder. The connection 178 receives one end of a conduit 180 the opposite end of which is connected with the inlet connection 181 in the disk portion 24 and leading into the interior of the air cylinder 22. It will be seen that the interior of the air cylinder 22 on the rear side of the piston 25 is continually in communication with vacuum through the line 180 and the fitting 175 since the connections 177 and 178 remain open at all times.

Figure 9:
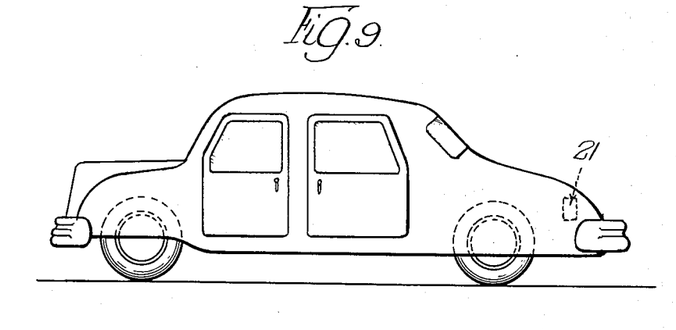
Fig. 9 is an elevational view of an automobile wherein the location of the skid control unit forming a part of the braking system of Fig. 1 is indicated diagrammatically.

The skid and jolt sensitive device 21 is mounted in a rearmost portion of the vehicle body as illustrated in Fig. 9. In this position it is subject to maximum whip action when the vehicle goes into a skid condition to either one side or the other. The device 21 comprises a support panel member 182, the upper end of which is mounted on a shaft 183 the opposite ends of which are supported in bearings 184—184 which are mounted on a rigid portion of the vehicle. The panel 182 is thus free to swing on the shaft 183 and the device 21 is so oriented that the shaft 183 extends crosswise of the vehicle whereby the panel 182 swings in a rear to front direction. Normally the panel 182 hangs straight down and is prevented from swinging forwardly by means of a spring 185 (Fig. 10) one end of which bears against the back side of the panel 182 and the other end of which is suitably supported against a rigid member 186 suitably attached by the vehicle frame. However, if the vehicle is stopped for some reason with a sudden jolt, the inertia of the device 21 will overcome the restraining force of the spring 185 and the lower end of the panel 182 will swing forward and push the operating button 187 of a microswitch 188 which is properly positioned and supported for such engagement by the bottom of the panel 182. The microswitch 188 is normally in the open condition. One terminal of the switch 188 is grounded as indicated while the other terminal is connected by means of a conductor 189 with the conductor 166 extending to the ground terminal 162 of the solenoid coil 160. When the switch 188 is closed by the forward swinging of the frame or panel 182, the terminal 162 of the solenoid will be grounded and the solenoid energized.

The panel 182 also supports a pendulum 191 carried on the bottom end of a support rod 192, the upper end of which is pivotally mounted by means of a pin 193 to the top of the panel 182 as shown. The pendulum is normally maintained in a center or neutral position by means of two centering springs 194 and 195 which are compressed between upstanding support members 196 and 197 formed on the panel 182 and opposite sides of the support rod 192 as shown in Fig. 1. The springs 194 and 195 are so calibrated that should the vehicle go into a skid the resulting whip action will be sufficient to overcome the centering forces of the springs depending upon which way the vehicle skids and the pendulum 191 will swing to one side or the other. A pair of microswitches 200 and 201 are provided which are each grounded as shown and so supported and positioned as to be engaged by opposite sides of the pendulum member 191. The non-ground terminals of each of these microswitches is connected by means of conductors 202 and 203, respectively, to the conductor 166. Accordingly, if the vehicle goes into a skid, the whip action will swing the pendulum 191 in that particular direction and one of the microswitches 200 or 201 will be closed whereupon the ground terminal 162 of the coil 160 will be grounded and the coil will be energized.

When the coil is energized upon the closing of any one of the microswitches 188, 200 or 201, the armature 153 will be withdrawn to the left as viewed in Fig. 1 and the valve member 156 will be removed from its closed position over the port 157 and will then close the port 172. This action serves to shut off the connection through the body between the nipples 167 and 168 thereby closing the communication provided by the conduit 41 between the valve control unit 18 and the front end of the air cylinder 22.

The operation of the brake system described above in connection with Figs. 1–10 is as follows: Assuming that a vehicle equipped with the brake system described above is moving forward and it is desired to bring the vehicle to a normal stop, the operator pushes down on the foot pedal 7 in the normal manner, whereupon the master cylinder 5 is operated through the linkage so as to expel brake fluid therefrom into the conduit 16. The movement of the displaced brake fluid is transmitted to the power-operated unit 17 through the inlet port 68 and passes through the passageway 66 into the lower portion of the passageway 64. The brake fluid movement continues into the annular chamber 56 formed around the extension 52 of the plunger housing 48 and passes through the port holes 55 into the annular chamber 54. From the annular chamber 54 the brake fluid movement passes through the passageway 63 and into the chamber 60 in the cylinder 59. As a result, brake fluid is expelled from the chamber 60 through the passageway 70 leading into the chamber 67 and thence into the second section of the conduit 16. Any tendency for the brake fluid to pass out through the passageway 80 leading from the chamber 60 is initially overcome by the pressure acting on the diaphragm 103 which is transmitted through the upper section of the passageway 64 and through the port 104 into the chamber 105, until the pressure in the system rises to a predetermined value which depends upon the strength of the springs used in unit 18 and other adjustments which may be made.

The pressure in the system rises when the master cylinder 5 is first operated and continues to rise rather gradually until the slack is taken up whereupon it rises sharply. The control valve unit 18 may be so adjusted and equipped with springs 111 and 124 of such strength that valve plunger 95 begins to shift and unseat the ball valve member 122 as soon as there is a slight rise in pressure and before the slack is taken up. Or the unit 18 may be so set and spring-equipped that all slack is first taken up and the pressure commences to rise steeply before the valve member 122 is unseated. Preferably, and in order to make full use of the power unit 17, the valve control unit 18 has a low setting so that it operates promptly to take up the slack and thereafter apply the brakes.

The movement of the brake fluid into the second section of the conduit 16 is transmitted therethrough to the pulsators 11—11 and 12—12 for the front and rear brakes, respectively.

After the pressure in the system rises to the predetermined value whereat pressure acting on the diaphragm 103 becomes sufficient to overcome the force of the pressure acting on the diaphragm 107 together with the force of the coil compression spring 111 and the spring 124, the valve plunger 95 is shifted to the right as viewed in Figs. 1 and 6 or downward as viewed in Fig. 5. This results in the turning of the valve control lever 101 in a clockwise direction as viewed in Fig. 5, whereupon the ball member 128 carried on the outer end thereof engages the ball valve member 122 and unseats it from the O-ring seat 126. Thereupon, atmospheric pressure is admitted through the port 117 into the chamber 116, through the port 130 into the chamber 91 from which it courses through the chamber 134 into the conduit 41 connected thereto. Since the skid control solenoid-operated valve 20 is de-energized at this time, the air pressure will pass through this valve in the manner explained above into the next section of the conduit 41 and thence into the front end of the air cylinder unit 22 where the air pressure acts on the outer or front side of the piston 25. As explained above, the rear of the air cylinder 22 is continually connected with the intake manifold of the vehicle so that the rear side of the piston 25 is exposed to sub-atmospheric pressure. The atmospheric pressure acting on the front side of the plunger 25 is sufficient to overcome the force of the coil compression spring 36 and the piston 25 starts to move to the rear or to the right as viewed in Fig. 1. It will be seen that this shifting movement of the piston 25 carries with it the piston rod 27 and as the movement continues the projecting end of the piston rod 27 passes through the seals at the entrance end of the chamber 60 and then into the end of the chamber 60 itself.

It will be seen that as soon as the full diameter of the end of the piston rod 27 enters the seal 61 fluid communication is shut off between the interior of the chamber 60 and the passageways leading thereinto, and the conduit 16 between the master cylinder 5 and the brakes is in effect mechanically severed just as if a plug were inserted in the conduit or a valve closed therein. In fact, the end of the piston rod 27 acts as a valve member to close the entrance into the chamber 60.

After the piston rod 27 enters the chamber 60, there is no space available for the fluid to expand from the master cylinder 5 except that small space provided by the accumulator 19, and therefore further downward movement of the brake pedal 7 is eliminated and the braking action is regulated by the pressure applied to the brake pedal.

As long as the control valve unit 18 continues to admit atmospheric pressure to the air cylinder 22, the piston 25 will continue to move against the force of the spring 36 and after the end of the piston rod 27 enters the chamber 60 it serves as a plunger to displace and raise the pressure of the hydraulic fluid therein. However, this increase in pressure in the chamber 60 is not communicated to the diaphragm 103 but only to the diaphragm 107. It will, of course, also be communicated through the outlet passage 70 to the second section of the conduit 16 and thence to the brakes 8 and 10 so as to apply braking pressure to the friction elements which have already been brought into engagement. Accordingly, the brakes begin to take hold at this point and the vehicle begins to slow down. If the operator is satisfied with the rate of deceleration, he holds the brake pedal 7 in position without pushing it further. Because of the fact that the pressure acting on the diaphragm 107 has increased but has not been counterbalanced by an increase in pressure acting on the diaphragm 103, a point will be reached during the movement of the end of the plunger end of the piston rod 27 into the cylinder 60 where the unbalanced pressure on the diaphragm 107 will be such as to shift the valve plunger 95 back to the left as viewed in Fig. 1 or 6 or up as viewed in Fig. 5. As a result of this movement it will be seen that the valve control lever 101 will be turned back to its neutral position so as to permit the ball valve member 122 to close and arrest the entrance of air pressure entering the valve control unit 18. The system may thus assume a balanced and stable condition with the brakes being applied with a uniform force.

If the operator releases the foot pedal 7 there will be a reduction in the pressure acting on the flexible diaphragm 103 and there will be a further shifting of the valve plunger member 95 to the left which may be sufficient to turn the lever 101 sufficiently to cause the ball end 128 on the valve control lever 101 to engage and unseat the ball valve member 123. Unseating of the ball valve member 123 results in placing the interior of the valve control unit 18 in communication with the sub-atmospheric pressure within the casing 23 on the rear side of the piston 25. This sub-atmospheric pressure is communicated through the conduit 41 to the head or front of the cylinder 22, thereby relieving the atmospheric pressure on the front side of the piston 25 and causing such pressure to become equalized with the sub-atmospheric pressure on the rear side thereof. Consequently, the spring 36 together with the back pressure in the cylinder 60 acting on the plunger 27 act to retract the plunger 25 and the piston rod 27. If the brake pedal 7 is released sufficiently, the piston 25 will be retracted far enough to withdraw the plunger end of the piston rod 27 from the cylinder 60. However, before the plunger end is completely withdrawn there will be a reduction of pressure in the chamber 60 and a corresponding reduction of pressure on the diaphragm 107 and on the brakes. Depending upon the extent to which the brake pedal 7 is released, such reduction in pressure in the chamber 60 may be sufficient so that the balanced or neutral condition of the control valve unit 18 is restored before the end of the connecting rod 27 is completely withdrawn from the chamber 60. If so, the brakes will continue to be applied steadily but with a reduced degree of braking action. It will be seen that full release of the foot pedal 7 will result in restoration of the operating parts to the condition shown in Figs. 1 and 6 wherein the plunger 25 occupies its fully retracted position and the projecting end of the connecting rod 27 is withdrawn from the chamber 60.

It will be seen that the stroke of the plunger 27 in the cylinder 59 may be conveniently made as long as desired in designing the power unit 17 by extending the length of the cylinder 59 without increasing its diameter.

It has been found that a smoother and more natural braking action can be obtained, particularly in the lower ranges of braking action such as are required in coming to a slow or gradual stop, by incorporating the modulator or accumulator unit 19. While an operator can with experience and skill learn to apply the brakes smoothly in the absence of the modulator device 19, to do so requires that the operator vary or depart from a normal braking movement and reaction. The reason for this is that when the brakes are applied and after the plunger end of the piston rod 27 has entered the cylinder 60, there will be no room for expansion of brake fluid expelled from the master cylinder 5 and since the brake fluid is itself non-compressible the brake pedal 7 will have to come to a dead (i. e. "hard") stop just as if it were to come up against a solid stop or block. Not only does the brake pedal 7 come to a dead stop under such circumstances but the entrance of the end of the piston rod 27 into the pressure chamber 60 results in the expulsion of brake fluid therefrom. A portion of the brake fluid expelled from the cylinder 60 goes into the chamber 92 where it acts against the diaphragm 107 so as to shift it to the left as explained above. This results in a corresponding shift of the diaphragm 103 which acts to back up the hydraulic fluid in the passageway 64 and through the passageway 66 into the section of the conduit 16 leading to the master cylinder 5. As a result there will be a very slight back-up of the brake pedal 7 which will be so small that it will not usually be consciously detected by the operator. However, this slight shifting of the valve plunger 95 has a tendency to cause the operator to push down harder on the brake pedal 7 so that in effect there is a tendency to over-brake the vehicle and bring it to a stop more abruptly than desired.

The provision of the accumulator or modulator device 19 serves to eliminate this condition and causes the braking system to operate smoothly and in a highly sensitive manner. From the operator's standpoint the brake pedal 7 has a "soft" action instead of a "hard" action and he is able to bring the vehicle to a gentle or gradual stop with ease. The device 19 operates in the following manner: The adjusting plug 137 is so set that the pressure acting on the plunger 140 will begin to overcome the compression of the spring 143 when the fluid pressure in the passageway 66 has reached a value of 50 pounds per square inch, for example. This pressure corresponds closely to the pressure in the system when the slack in the brakes has been taken up and the power unit 17 begins to operate so as to apply the braking action. On further increases of pressure in the passageway 66 acting on the plunger 140 the plunger will continue to shift to the right against the force of the spring 143 by amounts proportional to increases in pressure. In one setting the plunger 140 continued to shift until the fluid pressure acting on the plunger reached a value of 300 pounds per square inch, at which time the end of the cup portion 142 of the plunger came into engagement with the inner face of the adjusting plug 137 so that further shifting of the plunger was impossible.

While it is entirely practical to design the accumulator device 19 so that it will operate through a full range of pressures developed in the master cylinder, e. g. 50 pounds per square inch to 900 pounds, normally there will be no need to have it extend above 300 pounds per square inch since it is only in the lower range that the modulation action is required. Such modulation is not required or helpful when a fast braking action is called for and the operator thereupon applies the brakes as hard and fast as permissible without letting up on the pedal.

As will be seen from the foregoing description the skid control mechanism is not normally called upon or put in operation during normal braking action. However, if the brakes are applied and should the vehicle go into a skid for some reason, then the skid control sensitive element 21 operates in the manner described above and depending upon to which side the vehicle swings during the skid one of the microswitches 200 or 201 will be closed and the coil 160 of the solenoid 148 will be energized so as to operate the solenoid valve 20. Assume that the brakes are being applied and because the vehicle is in a skid condition the operator reacts normally and applies the brake pedal 7 all the harder so that the valve control unit 18 is in the condition where it admits atmospheric pressure to the air cylinder 22, as soon as the solenoid 160 is energized the valve member 156 is retracted so as to close the valve port 172 and in effect shut off the admission of air pressure to the air cylinder 22 and permit the air pressure to be vented through the port 157 which opens into the chamber 176 communicating with the intake manifold as explained above. This equalizes the pressure on opposite sides of the piston 25 and allows the spring 36 and the pressure in cylinder 60 to retract the piston rod 27 thereby reducing the pressure on the brakes and allowing the locked wheels to turn. As soon as the wheels begin to turn the vehicle normally comes out of the skid condition whereupon the pendulum member 191 again becomes centered and the microswitch 200 or 201 which was closed is opened so that the solenoid valve 20 is again de-energized. Thereupon the valve member 156 opens the port 172 so as to re-establish communication through the conduit 41 between the air cylinder 22 and the valve control unit 18 while closing off the port 157 in the valve 20. Normally the operator will still have his foot down hard on the brake pedal 7 and the brakes will again be applied as soon as the air pressure is once more admitted into the head of the air cylinder 22. It will be seen that the brakes are thus applied immediately after the vehicle resumes its forward movement with no delay whatsoever being involved and without any need for the operator to work the brake pedal or to re-apply the brakes. Should the vehicle go into another skid the operation will be repeated and as often as necessary until the vehicle is safely stopped.

The skid control device operates in a similar manner to prevent undue or excessive jolting. According to the setting of the coil compression spring 185 the panel member 182 will swing forward and close the microswitch 188 if the forward movement of the vehicle is stopped too abruptly, i. e. if there is a too severe jolt. This results in the operation of the solenoid-actuated valve 20 to release the brakes temporarily so as to permit the vehicle to roll forward and the action will be repeated as many times as necessary without loss of the brakes at any time.

It will be apparent that a number of modifications may be made in the apparatus described above in connection with Figs. 1–10. For example, the manually-controlled, power-operated unit shown in Fig. 1 of my said copending application Serial No. 208,951 may be substituted in place of the power unit 17. Likewise, instead of employing a power unit which is pneumatically operated, one may be employed which is hydraulically operated such as the unit shown and described in connection with Figs. 6 and 6a in my said copending application Serial No. 208,951.

The solenoid-operated skid control valve 20 may be replaced with valves of other design and several different designs and types of skid sensitive devices can be used in place of the unit 21.

The control valve unit 18, the accumulator 19 and the solenoid-operated valve 20 may either be directly mounted on the casting 9 or they may be separately mounted. The body of the control valve unit 18 may be integrally formed as part of the casting 9.

The power unit 17 with or without the skid control feature provided by the skid control valve 20 and the skid control responsive unit 21, may be sold and installed as an accessory, or the unit with or without the skid control features may be incorporated as part of the original equipment by the automobile manufacturer. When the unit is used as part of the original equipment, the automobile designer may reduce the brake pedal ratio and this reduction, together with the fact that after the unit comes into operation the brake pedal is frozen from further downward movement, permits the designer to specify a much lower brake pedal. This is a very desirable feature particularly in the case of automobiles having automatic transmissions which do not require clutch pedals.

Figure 11:
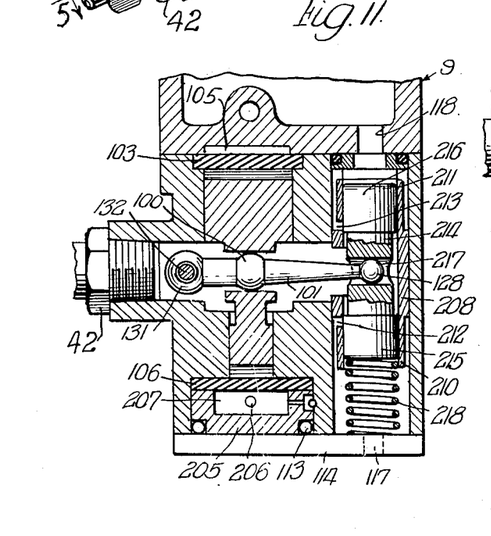
Fig. 11 is a fragmentary sectional view corresponding to Fig. 5 showing a modified control valve.

Referring to Fig. 11 of the drawings, a modification of the control valve unit 18 is shown which is indicated generally at 18'. Except as otherwise noted and indicated by different reference numerals, the various components of the control valve unit 18' are the same as those comprising the control unit 18 and like reference numerals are used to indicate like or corresponding parts. The plug member 112 is eliminated and replaced by a plug member 205 which is of different design because of the fact that in control unit 18' there is no spring which corresponds to the spring 111 in unit 18. The plug member 205 is circular and is provided in the bottom with a brake fluid inlet port 206 which corresponds to the port 115 in plug 112. The plug 205 is retained in place in section 92 of the valve chamber by means of the end plate member 114 and an O-ring 113 is used to provide a seal between the plug and the chamber. The inlet port 206 opens into an interior chamber 207 which is in communication with the outside of the diaphragm 107. The inner end of the plug member 203 fits against the periphery of the diaphragm 107 and retains the diaphragm firmly in place. Accordingly, in this arrangement there is no spring acting directly upon the shiftable plunger or valve member 95 and this member is subject to the differential in pressures acting on the diaphragms 103 and 107.

The ball valve arrangement utilized in the control valve unit 18 is replaced with a slidable valve member 208 which is generally in the form of a stationary sleeve positioned in the chamber 116 and having end portions or projections 210 and 211 which are hollow and of reduced diameter. The extension 210 is provided with an air pressure inlet port 212 while extension 211 has a corresponding vacuum port 213. A valve member 214 is slidable in the sleeve member 208 and has end portions 215 and 216 which slide within the extensions 210 and 211, respectively, and has a reduced diameter intermediate portion provided with a hole 217 in the middle for receiving the ball end 128 on the lever 101. A coil compression spring 218 is provided which fits between the cover plate 114 and the outer end of the section 215 of the slidable valve member as shown.

It will be seen that when the slidable member 214 is in the neutral position as shown in Fig. 11 the valve member sections 215 and 216, respectively, will lie over and close the ports 212 and 213. In operation when the pressure in the system begins to rise, the differential in pressure acting on opposite ends of the valve plunger 95 by reason of the difference in the effective areas of the diaphragms 103 and 107 will reach a predetermined point where it is sufficient to overcome the friction of the moving parts and to overcome the compression force of the spring 218. At this point the valve lever 101 will be rotated clockwise as viewed in Fig. 11 and will move the valve member 214 to the right so that the section 215 thereof is removed from the air pressure inlet port 212 thereby admitting air pressure through the port 117 and into the air cylinder unit 22 in the manner described above in connection with valve control unit 18. As a result, the air cylinder unit 22 is actuated and the power unit 17 is brought into action. As described above, the pressure acting on the diaphragm 107 will eventually be several times greater than the pressure acting on the diaphragm 103 and therefore if there is no corresponding increase in pressure on the diaphragm 103 the pressure will rise in the chamber 207 to the point where it will shift the valve member 95 back to its neutral position and if the pressure is released still further in the master cylinder the pressure on the diaphragm 107 will be sufficient to shift the valve member 214 to the left of neutral, thereby opening the vacuum port 213 so as to admit vacuum to the air cylinder 22. Accordingly, it will be seen that the over-all operation of the valve control unit 18' corresponds to that of the valve control unit 18.

Since these and certain further changes may be made without departing from the spirit and scope of the invention, all matter described above or shown in the accompanying drawings is intended to be interpreted as illustrative and not in a limiting sense.

What is claimed as new is:

1. In combination with a hydraulic brake system which includes a master cylinder, manually-operable means operatively connected with the master cylinder for operating the same, wheel brake units and conduit means interconnecting the master cylinder in fluid pressure-responsive relationship with the brake units, a power unit interconnected in series relationship in said conduit means having passageways therein including a pressure cylinder providing a path in series with said conduit means for the flow of brake fluid from said master cylinder to said brake units and comprising power means for forcing a plunger member through a seal into said pressure cylinder so as temporarily to sever said path and pressurize brake fluid therein in communication with said brake units, control valve means for said power means for controllably actuating the same and being interconnected in direct hydraulic pressure-responsive relationship with both said master cylinder and said pressure cylinder, said power means remaining inactive until the hydraulic pressure in the system rises to a predetermined value whereupon said power means is actuated to force said plunger member into said pressure cylinder and pressurize the hydraulic fluid therein in proportion to increases in pressure developed by said master cylinder, and skid control means operatively interconnected with said power means for deactivating the same whenever a vehicle equipped with said brake system goes into a skid.

2. In combination with a hydraulic brake system which includes a master cylinder, manually-operable means operatively connected with the master cylinder for operating the same, wheel brake units and conduit means interconnecting the master cylinder in fluid pressure-responsive relationship with the brake units, a power unit interconnected in series relationship in said conduit means having passageways therein including a pressure cylinder providing a path in series with said conduit means for the flow of brake fluid from said master cylinder to said brake units and comprising power means for forcing a plunger member into said pressure cylinder so as temporarily to sever said path and pressurize brake fluid therein in communication with said brake units, control valve means for said power means for controllably actuating the same and being interconnected in direct hydraulic pressure-responsive relationship with both said master cylinder and said pressure cylinder, said power means remaining inactive until the hydraulic pressure in the system rises to a predetermined value whereupon said power means is actuated to force said plunger member into said pressure cylinder and pressurize the hydraulic fluid therein in proportion to increases in pressure developed by said master cylinder, and skid control means operatively interconnected with said power means for deactivating the same whenever a vehicle equipped with said brake system goes into a skid.

3. In combination called for in claim 2 a pressure accumulator device connected in pressure-responsive communication with said master cylinder and having a pressure-loaded expansion element therein.

4. In combination with a hydraulic brake system which includes a master cylinder, manually-operable means operatively connected with the master cylinder for operating the same, wheel brake units and conduit means interconnecting the master cylinder in fluid pressure-responsive relationship with the brake units, a power unit interconnected in series relationship in said conduit means having passageways therein including a pressure cylinder providing a path in series with said conduit means for the flow of brake fluid between said master cylinder and said brake units and comprising air-operated power means having a projecting plunger member positioned to be forced into said pressure cylinder through an entrance seal so as temporarily to sever said path and pressurize brake fluid therein in communication with said brake units, a hydraulically-operated control valve for said power means for alternately admitting and discharging actuating air pressure thereto and being interconnected in direct hydraulic pressure-responsive relationship with said master cylinder and with said pressure cylinder and sensitive to the differential in pressure therebetween, said control valve operating to actuate said power means whenever the hydraulic pressure in said system reaches a predetermined value whereupon hydraulic fluid in said pressure cylinder is pressurized by said plunger member in proportion to the pressure created by said master cylinder, and skid control means operatively disposed in the interconnection between said control valve and said pressure cylinder and operable to interrupt such interconnection and deactivate said power means as long as a vehicle equipped with said brake system is in a skid condition.

5. In combination with a hydraulic brake system which includes a master cylinder, manually-operable means operatively connected with the master cylinder for operating the same, wheel brake units and conduit means interconnecting the master cylinder in direct fluid pressure-responsive relationship with the brake units, a pressure cylinder having an entrance opening in one end thereof and having a discharge passageway removed from said entrance opening, said pressure cylinder being interconnected in series in said conduit means with said entrance opening being connected with said master cylinder and with said discharge passageway being connected with said brake units whereby the chamber of said pressure cylinder forms a portion of the fluid path between said master cylinder and said brake units, a plunger reciprocably mounted for entrance into and withdrawal from said pressure cylinder unit through said entrance opening therein, power-actuating means operatively connected with said plunger for reciprocating the same, control means for said power-actuating means interconnected in controlling relationship therewith and interconnected in differential pressure-responsive relationship directly with said master cylinder and directly with said pressure cylinder, said control means being operable in response to hydraulic pressure created in said system by said master cylinder to actuate said power-actuating means whenever the system hydraulic pressure reaches a predetermined value not exceeding that necessary to take up the slack in the brake units, interrupter means interposed in series relationship in said control interconnection between said control means and said power-actuating means, and a skid sensitive unit operatively connected with said interrupter means for temporarily interrupting said control interconnection whenever a vehicle equipped with said system is in a skid condition.

6. The combination called for in claim 5, wherein said interrupter means is a solenoid-operated valve and said skid sensitive unit comprises pendulum means adapted to swing when the equipped vehicle goes into a skid or jolt, and switches positioned so as to be closed by said pendulum means with said switches being interconnected in electrical circuit control relationship with said solenoid valve.

7. In combination with a fluid-operated brake system which includes a master cylinder, manually-operable means operatively connected with the master cylinder for operating the same, wheel brake units and conduit means interconnecting the master cylinder in fluid pressure-responsive relationship with the brake units, a pressure cylinder having an entrance opening in one end thereof and having a discharge passageway removed from said entrance opening, said pressure cylinder being interconnected in series in said conduit means with said entrance opening being connected with said master cylinder and with said discharge passageway being connected with said brake units whereby the chamber of said pressure cylinder forms a portion of the fluid path between said master cylinder and said brake units, a plunger reciprocably mounted for entrance into and withdrawal from said pressure cylinder unit through said entrance opening therein and through seal means located thereat, power-actuating means operatively connected with said plunger for reciprocating the same, control means for said power-actuating means interconnected in controlling relationship therewith and interconnected in differential pressure-responsive relationship with said master cylinder and said pressure cylinder, said control means being operable in response to pressure created in said system by said master cylinder to actuate said power-actuating means whenever the system pressure reaches a predetermined value, and a pressure accumulator device connected in pressure-responsive relationship with said master cylinder and having a pressure-loaded expansion element therein.

8. The combination called for in claim 7 wherein said pressure cylinder, plunger, power-actuating means, control means for said power-actuating means and said pressure accumulator device are combined in one unit adapted to be interconnected in said conduit means.

9. For combination with a hydraulic brake system including a master cylinder, manually-operable means operatively connected with the master cylinder for actuating the same, wheel brakes and conduit means interconnecting the master cylinder in fluid pressure communication with the brakes, a manually-controlled, power-operated unit adapted to deliver braking pressures in response to substantially smaller pressures created by the master cylinder, comprising, a pressure cylinder having an entrance opening in one end thereof and having a discharge passageway removed from said entrance opening, said pressure cylinder being adapted to be interconnected in series in said conduit means with said entrance opening being connected with the master cylinder and with said discharge passageway being connected with the wheel brakes whereby when so interconnected the chamber of said pressure cylinder forms a portion of the fluid path between the master cylinder and the brakes, a plunger reciprocably mounted for entrance into and withdrawal from said pressure cylinder through said entrance opening therein, seal means disposed at said entrance opening to provide a fluid-tight seal around said plunger when it enters said cylinder, power-actuating means for said plunger operatively connected therewith for reciprocating the same, control valve means for said power-actuating means interconnected in controlling relationship therewith, said control valve means being operable in response to the differentials in pressure between the pressure created by the master cylinder and the pressure within said pressure cylinder, said control valve means having two port openings one of which is adapted to be connected in fluid pressure communication with the master cylinder and means conecting the other port opening with said pressure cylinder, and a pressure accumulator adapted to be connected in pressure-responsive relationship with said master cylinder and having a pressure-loaded expansion element therein.

10. The power-operated unit called for in claim 9 wherein safety by-pass means are interposed in parallel relationship with said pressure cylinder and a one-way valve is disposed in said by-pass which valve is normally closed when the pressure in said pressure cylinder is equal or greater than the pressure developed by said master cylinder and which valve opens to by-pass said pressure cylinder if the pressure developed by said master cylinder exceeds the pressure in said pressure cylinder.

11. For combination with a hydraulic brake system including a master cylinder, manually-operable means operatively connected with the master cylinder for actuating the same, wheel brakes and conduit means interconnecting the master cylinder in fluid pressure communication wtih the brakes, a manually-controlled, power-operated unit adapted to deliver braking pressures in response to substantially smaller pressures created by the master cylinder, comprising, a pressure cylinder having an entrance opening in one end thereof and having a discharge passageway removed from said entrance opening said pressure cylinder being adapted to be interconnected in series in said conduit means with said entrance opening being connected with the master cylinder and with said discharge passageway being connected with the wheel brakes whereby when so interconnected the chamber of said pressure cylinder forms a portion of the fluid path between the master cylinder and the brakes, a plunger reciprocably mounted for entrance into and withdrawal from said pressure cylinder through said entrance opening therein, seal means disposed at said entrance opening to provide a fluid-tight seal around said plunger when it enters said cylinder, power-actuating means for said plunger operatively connected therewith for reciprocating the same, control valve means for said power-actuating means interconnected in controlling relationship therewith, said control valve means being operable in response to the differentials in pressure between the pressure created by the master cylinder and the pressure within said pressure cylinder, said control valve means having two port openings one of which is adapted to be connected in fluid pressure communication with the master cylinder and means connecting the other port opening with said pressure cylinder, and skid control means comprising interrupter means interposed in series relationship in said interconnection between said control valve and said power-actuating means and a skid sensitive unit adapted to be mounted on a vehicle in such position that it receives the whip action when the vehicle goes into a skid, said skid sensitive unit being interconnected in control relationship with said interrupter means for temporarily deactivating said power-actuating means when the equipped vehicle goes into a skid.

12. For combination with a hydraulic brake system including a master cylinder, manually-operable means operatively connected with the master cylinder for actuating the same, wheel brakes and conduit means interconnecting the master cylinder in fluid pressure communication with the brakes, a manually-controlled, power-operated unit adapted to deliver braking pressures in response to substantially smaller pressures created by the master cylinder, comprising, a pressure cylinder having an entrance opening in one end thereof and having a discharge passageway removed from said entrance opening, said pressure cylinder being adapted to be interconnected in series in said conduit means with said entrance opening being connected with the master cylinder and with said discharge passageway being connected with the wheel brakes whereby when so interconnected the chamber of said pressure cylinder forms a portion of the fluid path between the master cylinder and the brakes, a plunger reciprocably mounted for entrance into and withdrawal from said pressure cylinder through said entrance opening therein, seal means disposed at said entrance opening to provide a fluid-tight seal around said plunger when it enters said cylinder, power-actuating means for said plunger operatively connected therewith for reciprocating the same, control valve means for said power-actuating means interconnected in controlling relationship therewith, said control valve means being operable in response to the differentials in pressure between the pressure created by the master cylinder and the pressure wtihin said pressure cylinder, said control valve means having two port openings one of which is adapted to be connected in fluid pressure communication with the master cylinder and means connecting the other port opening with said pressure cylinder, a pressure accumulator adapted to be connected in pressure-responsive relationship with said master cylinder and having a pressure-loaded expansion element therein, and skid control means comprising interrupter means interposed in series relationship in said interconnection between said control valve and said power-actuating means and a skid sensitive unit adapted to be mounted on a vehicle in such position that it receives the whip action when the vehicle goes into a skid, said skid sensitive unit being interconnected in control relationship with said interrupter means for temporarily deactivating said power-actuating means when the equipped vehicle goes into a skid.

13. For combination with a hydraulic brake system including a master cylinder, manually-operable means operatively connected with the master cylinder for actuating the same, wheel brakes and conduit means interconnecting the master cylinder in fluid pressure communication with the brakes, a manually-controlled, power-operated unit adapted to deliver braking pressures in response to substantially smaller pressures created by the master cylinder, comprising, a casting which includes an elongated pressure cylinder extending at right angles from the center of a disk portion, said pressure cylinder being closed at its outer end and the inner end opening into a central chamber formed in the center of said disk portion, a brake fluid inlet passageway in said casting leading to said chamber and the outer end of which is adapted to be connected in fluid pressure communication with said master cylinder, a brake fluid outlet port in the wall of said pressure cylinder adapted to be connected in fluid pressure communication with said brakes, an air cylinder unit comprising a casing one end of which is secured to said disk portion and a piston rod which projects from said air cylinder unit in coaxial alignment with said pressure cylinder so as to be projected into and withdrawn from said pressure cylinder, the projecting end of said piston rod having a clearance with respect to the inner bore of said pressure cylinder, annular seal means in said central chaimber adjacent the entry into said pressure cylinder for providing a fluid-tight seal for the entrance of said piston rod into said cylinder, a differential control valve unit mounted on said casting and having two brake fluid inlet ports, one of which is adapted to receive fluid pressure from said master cylinder and the other of which is adapted to receive fluid pressure from said pressure cylinder, said casting having a passageway therein communicating brake fluid from said inlet passageway to said valve control unit port adapted to receive fluid pressure from said master cylinder and said pressure cylinder having a second outlet port in the wall thereof communicating into said valve control unit port adapted to receive pressure from said pressure cylinder, said control valve unit being adapted to be connected to a source of atmospheric pressure and a source of vacuum and having a delivery port which communicates either atmospheric pressure or vacuum depending upon the operation of said control valve, and conduit means interconnecting said delivery port with the lead end of said air cylinder unit so as to alternately deliver air pressure or vacuum to said air cylinder unit, and a port in the bore end of said air cylinder unit adapted to be interconnected with a source of vacuum.

14. The manually-controlled, power-operated unit called for in claim 13 wherein the bore of said air cylinder unit has a closure plate therein which serves to support the actuating compression spring of the unit, and a plurality of bolts passing through said disk portion of said casting and extending into said closure plate for securing said air cylinder unit to said casting.

15. A differential control valve unit for the power unit of a hydraulic brake system, adapted to be operatively controlled by differential brake fluid pressures in the system to alternately deliver vacuum and air pressure through a delivery port, said unit comprising a valve body having first and second parallel and elongated chambers therein, a valve operating plunger member slidable in the first of said chambers, diaphragms disposed in the opposite ends of said first chamber so as to act on opposite ends of said plunger member the effective pressure area of one of said diaphragms being greater than that of the other, port means in said valve body leading into the opposite ends of said first chamber, said valve body having a transverse connecting passageway communicating between the central portions of said first and second chambers and having a delivery port therein leading into the center of said first chamber on the opposite side thereof from said second chamber and in alignment with said transverse connecting passageway, a valve operating lever one end of which extends into said delivery port and the other end of which is disposed in the central portion of said second chamber with the intermediate portion of the valve lever passing through said transverse connecting passageway, means for pivoting the end of said lever which is in said delivery port whereby shifting of said valve plunger in said first chamber serves to pivot said lever and move the end thereof which is in said second chamber, inlet ports for air pressure and vacuum in said second chamber, and valve means for closing each of said ports, said valve means being operated by the end of said valve lever whereby both of said ports may be closed or either one opened while the other is closed.

16. For combination with a hydaulic brake system which includes a master cylinder, manually-operable means operatively connected with the master cylinder for operating the same, wheel brake units and conduit means interconnecting the master cylinder in fluid pressure-responsive relationship with the brake units, manually controlled power braking means comprising, in combination, a power unit interconnected in series relationship in said conduit means having passageways therein including a pressure cylinder providing a path in series with said conduit means for the flow of brake fluid from said master cylinder to said brake units and comprising power means for forcing a plunger member through a seal into said pressure cylinder so as temporarily to sever said path and pressurize brake fluid therein in communication with said brake units, control valve means for said power means for controllably actuating the same and being interconnected in direct hydraulic pressure-responsive relationship with both said master cylinder and said pressure cylinder, said power means remaining inactive until the hydraulic pressure in the system rises to a predetermined value whereupon said power means is actuated to force said plunger member into said pressure cylinder and pressurize the hydraulic fluid therein in proportion to increase in pressure developed by said master cylinder, and a pressure accumulator device connected in pressure-responsive communication with said master cylinder having a pressure-loaded expansion element therein.

References Cited in the file of this patent
UNITED STATES PATENTS

| | | |
|---|---|---|
| 1,982,354 | Rowley | Nov. 27, 1934 |
| 2,183,803 | Betts | Dec. 19, 1939 |
| 2,275,697 | Stelzer | Mar. 10, 1942 |
| 2,365,180 | Eksergian | Dec. 19, 1944 |
| 2,381,989 | Stelzer | Aug. 14, 1945 |
| 2,434,588 | Rockwell | Jan. 13, 1948 |
| 2,448,464 | Rockwell | Aug. 31, 1948 |
| 2,512,427 | Heller | June 20, 1950 |